US009009759B2

(12) United States Patent
Estipona

(10) Patent No.: US 9,009,759 B2
(45) Date of Patent: Apr. 14, 2015

(54) TERMINATING ENHANCED TELEVISION BROADCASTS

(71) Applicant: Intel Corporation, Santa Clara, CA (US)

(72) Inventor: Jim B. Estipona, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/890,567

(22) Filed: May 9, 2013

(65) Prior Publication Data

US 2013/0305277 A1    Nov. 14, 2013

Related U.S. Application Data

(63) Continuation of application No. 13/005,895, filed on Jan. 13, 2011, now Pat. No. 8,443,402, which is a continuation of application No. 11/880,283, filed on Jul. 20, 2007, now Pat. No. 7,895,628, which is a continuation of application No. 09/663,601, filed on Sep. 18, 2000, now Pat. No. 7,263,711.

(51) Int. Cl.

| G06F 3/00 | (2006.01) |
|---|---|
| G06F 13/00 | (2006.01) |
| H04N 5/445 | (2011.01) |
| H04N 21/488 | (2011.01) |
| H04N 7/16 | (2011.01) |
| H04N 7/173 | (2011.01) |
| H04N 21/235 | (2011.01) |

(Continued)

(52) U.S. Cl.

CPC ........... *H04N 21/4882* (2013.01); *H04N 7/163* (2013.01); *H04N 7/17318* (2013.01); *H04N 21/235* (2013.01); *H04N 21/4312* (2013.01); *H04N 21/4314* (2013.01); *H04N 21/435* (2013.01); *H04N 21/462* (2013.01); *H04N 21/4722* (2013.01); *H04N 21/6187* (2013.01); *H04N 21/6581* (2013.01); *H04N 21/8133* (2013.01); *H04N 21/8586* (2013.01)

(58) Field of Classification Search
USPC ................. 725/60–61, 109–110, 112, 52, 58
See application file for complete search history.

(56) References Cited

U.S. PATENT DOCUMENTS

| 5,559,550 A | 9/1996 | Mankovitz |
|---|---|---|
| 5,937,331 A | 8/1999 | Kalluri et al. |

(Continued)

FOREIGN PATENT DOCUMENTS

WO    WO 98/53611    11/1998

OTHER PUBLICATIONS

"Advanced Television Enhancement Forum Specification (ATVEF)", Draft, Version 1.1r26 updated Feb. 2, 1999, pp. 1-37.

*Primary Examiner* — Jason Salce
(74) *Attorney, Agent, or Firm* — Lynch Law Patent Group, P.C.

(57) ABSTRACT

An enhanced television broadcast system may enable the transmission and reception of a real-time event when a new program is about to begin. The real-time event may control access to enhancements from the program that is ending. In some embodiments, these real-time events may constitute triggers that are included within packets transmitted in an Internet Protocol multicast. As one example, the trigger may include a Uniform Resource Locator in the form of a tv: protocol that automatically causes the television display to go to full screen television.

13 Claims, 5 Drawing Sheets

(51) Int. Cl.
  *H04N 21/431*  (2011.01)
  *H04N 21/435*  (2011.01)
  *H04N 21/462*  (2011.01)
  *H04N 21/4722* (2011.01)
  *H04N 21/61*   (2011.01)
  *H04N 21/658*  (2011.01)
  *H04N 21/81*   (2011.01)
  *H04N 21/858*  (2011.01)

(56) References Cited

U.S. PATENT DOCUMENTS

| | | | |
|---|---|---|---|
| 5,971,849 A | 10/1999 | Falciglia | |
| 5,991,747 A | 11/1999 | Tomoyuki et al. | |
| 6,025,837 A | 2/2000 | Matthews, III et al. | |
| 6,108,706 A | 8/2000 | Birdwell et al. | |
| 6,177,931 B1 | 1/2001 | Alexander et al. | |
| 6,205,485 B1 | 3/2001 | Kikinis | |
| 6,240,555 B1 | 5/2001 | Shoff et al. | |
| 6,281,877 B1 | 8/2001 | Fisher et al. | |
| 6,338,094 B1 | 1/2002 | Scott et al. | |
| 6,356,939 B1 | 3/2002 | Dahl | |
| 6,442,755 B1 | 8/2002 | Lemmons et al. | |
| 6,502,243 B1 | 12/2002 | Thomas | |
| 6,549,718 B1 * | 4/2003 | Grooters et al. | 386/291 |
| 6,571,392 B1 | 5/2003 | Zigmond et al. | |
| 6,608,633 B1 | 8/2003 | Sciammarella et al. | |
| 6,637,032 B1 | 10/2003 | Feinleib | |
| 6,785,902 B1 | 8/2004 | Zigmond et al. | |
| 6,795,973 B1 | 9/2004 | Estipona | |
| 6,813,776 B2 | 11/2004 | Chernock et al. | |
| 7,069,571 B1 | 6/2006 | Del Sesto et al. | |
| 7,174,562 B1 * | 2/2007 | Leak et al. | 725/110 |
| 7,263,711 B1 | 8/2007 | Estipona | |
| 2001/0037376 A1 * | 11/2001 | Ullman et al. | 709/218 |

* cited by examiner

TERMINATING ENHANCED TELEVISION BROADCASTS

CROSS-REFERENCE TO RELATED APPLICATION

This application is a continuation of U.S. patent application Ser. No. 13/005,895, filed on Jan. 13, 2011, which issued as U.S. Pat. No. 8,443,402, which is a continuation of U.S. patent application Ser. No. 11/880,283, filed on Jul. 20, 2007, which issued as U.S. Pat. No. 7,895,628, which is a continuation of U.S. patent application Ser. No. 09/663,601, filed on Sep. 18, 2000, which issued as U.S. Pat. No. 7,263,711.

BACKGROUND

This invention relates generally to enhanced television broadcasts which are also sometimes known as interactive television broadcasts.

In enhanced television or interactive broadcasts, a television program may be broadcast together with certain enhancements. The enhancements may in some cases be related to the television program and may be accessed through hypertext markup language documents. These documents may be transmitted with the television program or may be accessible independently from the program, for example over the Internet. Thus, in many cases, the enhancements add to the information that viewers can obtain about a particular program.

Conventionally, the enhancements relate to a particular television program. At the end of that program therefore, it may be desirable to terminate the availability of the enhancement. Otherwise, viewers may become confused because enhancements associated with one program may then be accessed during subsequent programs.

One applicable specification, the ATVEF Specification, suggests that script or other scripting mechanisms be utilized to terminate the enhancements at the end of a television program. See Advanced Television Enhancement Forum (ATVEF) Enhanced Content Specification, v. 1.1r26 (1998-99) (hereinafter the "ATVEF Specification"). However, the ATVEF Specification provides no particular technique to do so. Using scripts or scripting mechanisms may add complexity.

In addition, problems may arise with respect to terminating enhancements automatically at the end of the program. For example, a viewer may be viewing an enhancement associated with one program and may not care about the ensuing program. Instead, the viewer may wish to continue to view enhancements related to a previous program regardless of the ensuing program. Therefore, adopting the approach suggested in the ATVEF Specification may be annoying for some viewers.

Thus, there is a need for better ways to ensure that enhancements associated with one program are not inadvertently made available during an ensuing program.

DETAILED DESCRIPTION

Figure 1:
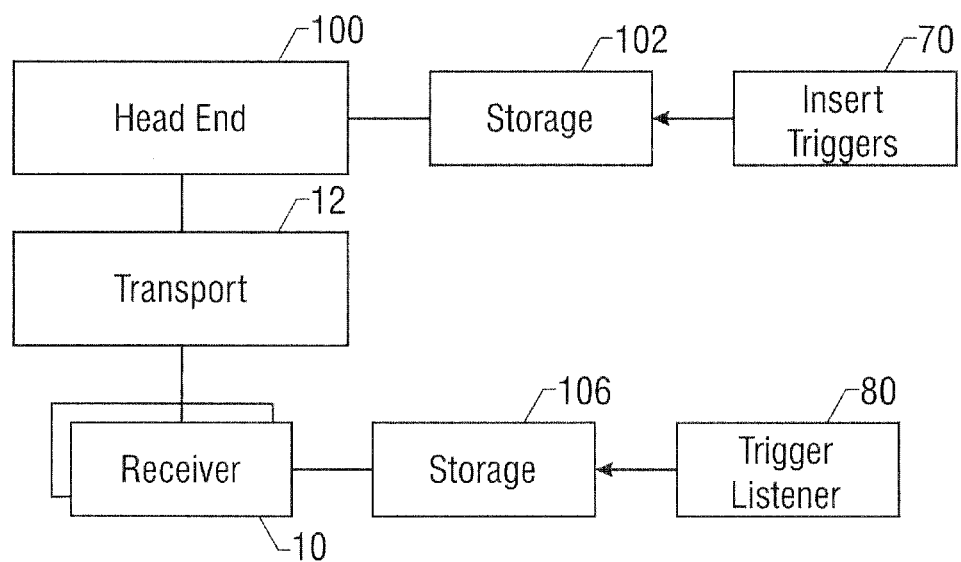
FIG. 1 is an architecture level view of an enhanced television broadcast system in accordance with one embodiment of the present invention.

Referring to FIG. 1, an enhanced television broadcasting system or interactive television system may include a head end or server 100 that broadcasts television content together with announcements and triggers over a transport 12 to a plurality of receivers 10. Among the possible transports 12 are an airwave broadcast, a satellite transmission, an Internet network and a cable system. The head end may broadcast the content together with the enhancements or the enhancements may be accessed using triggers that accompany the broadcast over the transport 12.

A trigger is a real time event for an enhanced television program broadcast, for example in accordance with the ATVEF Specification. Generally, triggers include attributes as well as a Uniform Resource Locator or URL. The URL may provide information about where to access a particular resource associated with an enhancement. The resource may be the actual content of the enhancement. In some cases, the resource may be cached on the receiver 10 or, in other cases, the trigger may facilitate accessing the resource at a remote location, for example over the Internet.

While FIG. 1 illustrates a system where the head end 100 broadcasts directly to a receiver 10, in some cases, the head end 100 may broadcast to an intermediate retransmitter, such as a network operating center (not shown), that then broadcasts to a plurality of receivers 10.

In some embodiments of the present invention, the broadcast mechanism may include the use of Internet Protocol packets that encapsulate television content together with announcements and triggers, as well as enhancements in some cases. Thus, the broadcast may be in accordance with known specifications such as the ATVEF Specification in some embodiments.

The head end 100 may be a processor-based system that includes a storage 102 that may store software 70 for inserting triggers into the broadcast stream. Similarly, each receiver 10 may be a processor-based system that includes a storage 106 that stores trigger listener software 80. The software 80 listens or monitors for the triggers inserted by the head end 100 and processes them in a fashion that will be described hereinafter.

Figure 2:
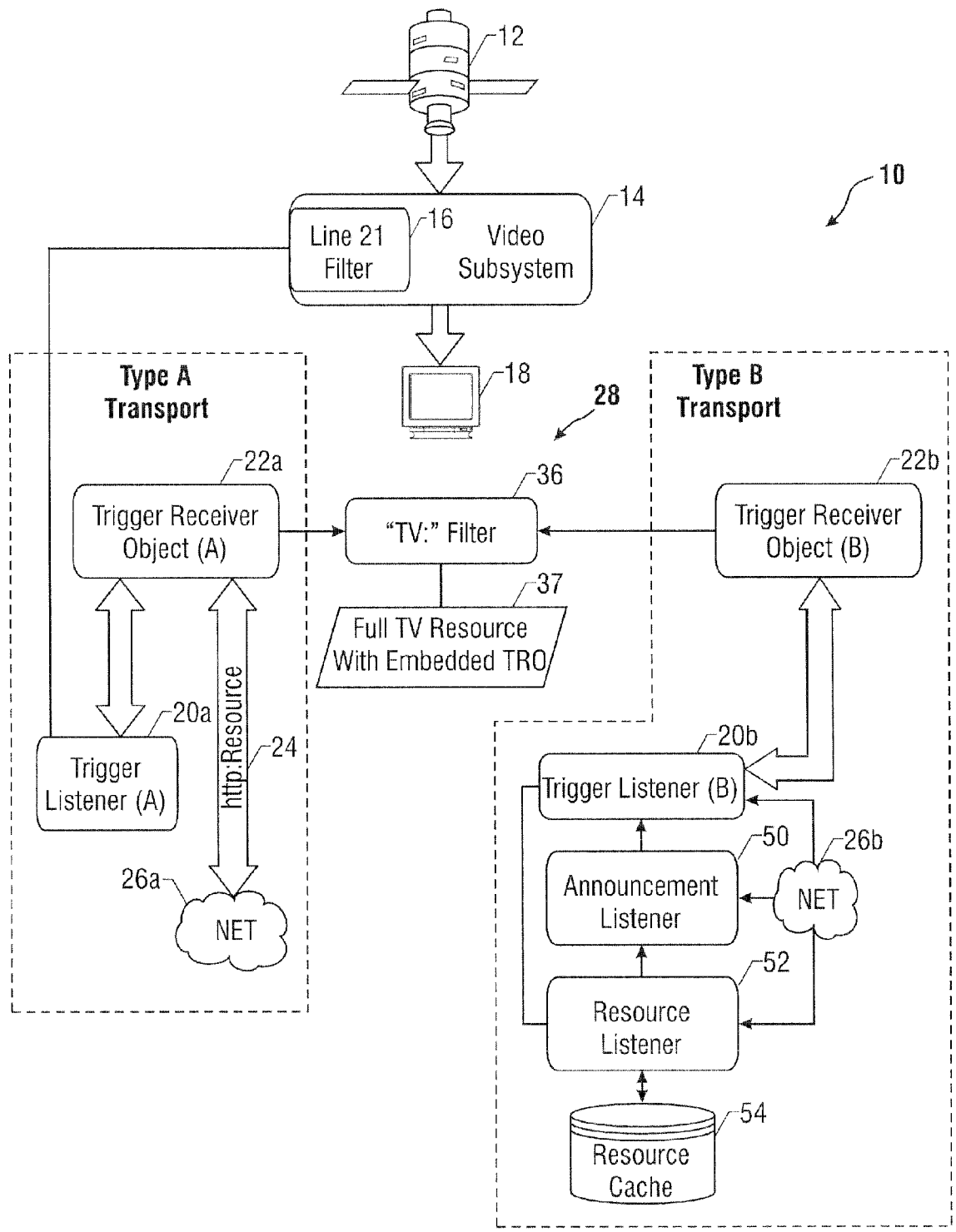
FIG. 2 is a schematic depiction of the system shown in FIG. 1.

Referring next to FIG. 2, an example of one interactive broadcasting system is illustrated. In this example, the head end 100 may provide the enhanced broadcast to a satellite transport 12 as one example. The satellite transport 12 may then implement a digital or analog transmission to a plurality of receivers 10.

Each receiver 10 may include a video subsystem 14 that includes a line 21 filter 16. The line 21 filter extracts information, for example out of the vertical blanking interval (VBI) and provides it to a trigger listener 20a. The trigger listener 20a operates in accordance with a type A transport medium specified in the ATVEF Specification. In a type A transport, the actual resource may be accessed over the Internet or at another remote location and is not conventionally broadcast with the rest of the enhanced television content.

The trigger listener 20a detects a trigger and passes a message to a trigger receiver object 22a. The trigger receiver object (TRO) 22*a*, in accordance with the ATVEF Specification for example, is an application level software program that handles the processing of received triggers. The trigger receiver object 22*a* then is able to use an appropriate protocol such as the hypertext transfer protocol or http: protocol to access a resource over the Internet 26*a* using a channel 24. The channel 24 is conventionally a telephone line or other backchannel that may be utilized to access a resource.

The video subsystem 14 may display the television program on a suitable television receiver 18. While an analog system is illustrated in FIG. 2, the present invention is equally applicable to digital broadcasting systems as well.

Similarly, a trigger receiver object 22*b* is utilized for a type B transport in accordance with an embodiment following the ATVEF Specification. In a type B transport the enhancement may be transmitted with the television content, for example over the Internet 26*b*. The received multicast is analyzed by a trigger listener 20*b*, announcement listener 50 and resource listener 52. Resources or enhancements may be cached in the cache 54. The trigger listener 20*b* communicates with a trigger receiver object 22*b*.

A tv: protocol filter 36 filters the tv: protocol from a trigger receiver object 22 and accesses a full television screen resource with embedded trigger receiver objects 37. Thus, the filter 36 identifies the tv: protocol within a trigger and in response thereto generates a full screen display.

Figure 3:
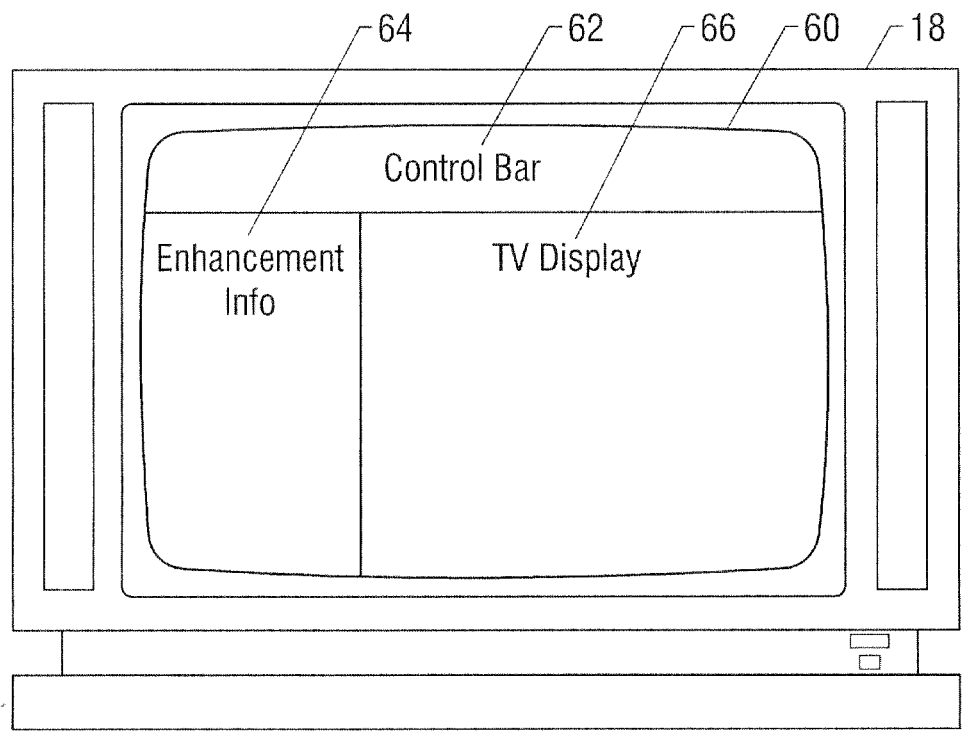
FIG. 3 is a depiction of a graphical user interface or screen display in accordance with one embodiment of the present invention.

Referring to FIG. 3, the frame makeup of the interface displayed on a television receiver 18 may be controlled by the code that is included with the television enhancements. Thus, as one example, a television frame display 66 may be displayed on the screen 60; however, the screen 60 may be broken up into other frames or fields including an enhancement information frame 64 and a control bar 62.

The enhancement information frame 64 enables the user to select enhancements associated with the current television display frame 66. The control bar 62 may allow the user to select various functions available with the enhanced broadcast. Of course, a wide variety of other screen formats and framing may be selected by creators to meet particular needs. However, the display shown in FIG. 3 is illustrative of the circumstance where not only may a viewer watch television but at the same time, the viewer can select enhancement information from the frame 64, for example using a mouse function available through a remote control (not shown).

The problem arises that when a first program ends and a new program starts, the user can continue to access enhancements associated with the first program. It may be desirable in some embodiments to remove the possibility of accessing first program enhancements, for example through the enhancement information field 64, at or near the end of the first program. This is in keeping with the suggestion incorporated into the ATVEF Specification that enhancements should not be automatically made available in ensuing television programs.

Figure 4:
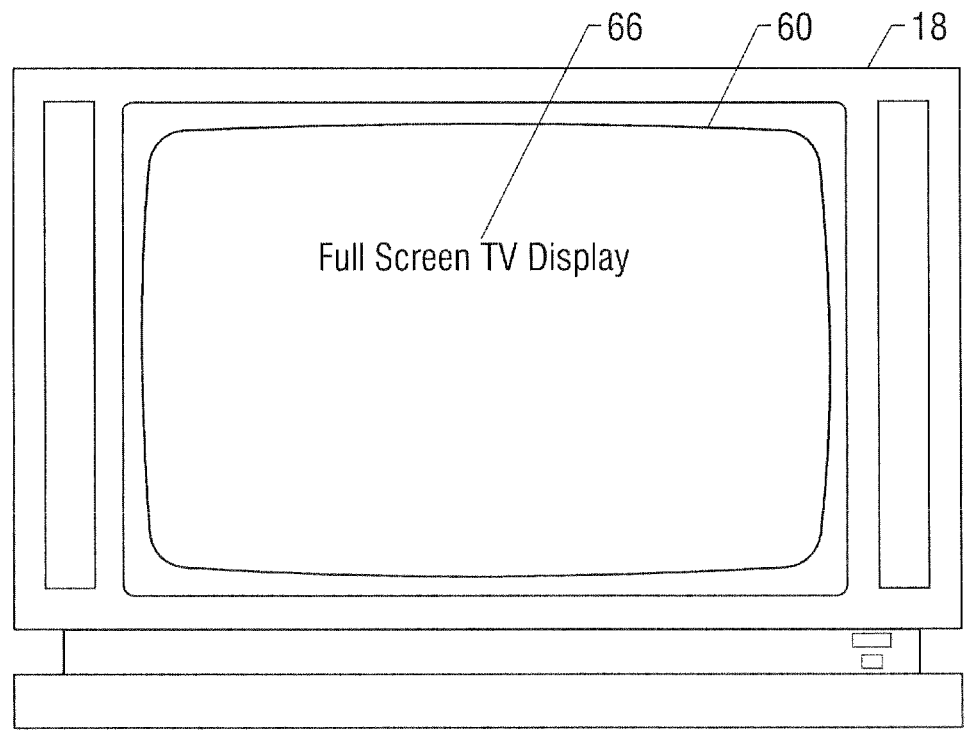
FIG. 4 is a graphical user interface or screen display in accordance with one embodiment of the present invention.

Referring to FIG. 4, a full screen television display 66 may replace the display shown in FIG. 3. For example, in accordance with one embodiment of the present invention, a trigger may include the tv: protocol at the end of a television program. Upon receipt of this protocol, the tv: filter 36 automatically transitions the screen display 60 to a full screen television. This necessarily removes the capability of accessing enhancements since the viewer may no longer have access to the frame 64 that enables the selection of enhancement information.

Thus, going to full screen at the end of the program may serve two equally important functions. Firstly, it may advise the viewer that the end of a first program is approaching or has arrived and a new program is available. Secondly, it may remove the possibility of accessing enhancements associated with the first program at a time when those enhancements may be disabled or would otherwise be confusing because of the arrival of the new program. In other words, it makes it more difficult for the user to automatically continue watching enhancements that do not apply to a new program.

While the use of the tv: protocol is a very effective way to automatically achieve both functions, other screen displays may be utilized to accomplish one or both functions. As a simple example, the screen display may simply transition to a display that says the user should no longer activate enhancements since a new program is about to start. Any number of web pages may be accessed from locally cached resources or over the Internet to facilitate one or both of the above-described functions without using the tv: protocol.

Figure 5:
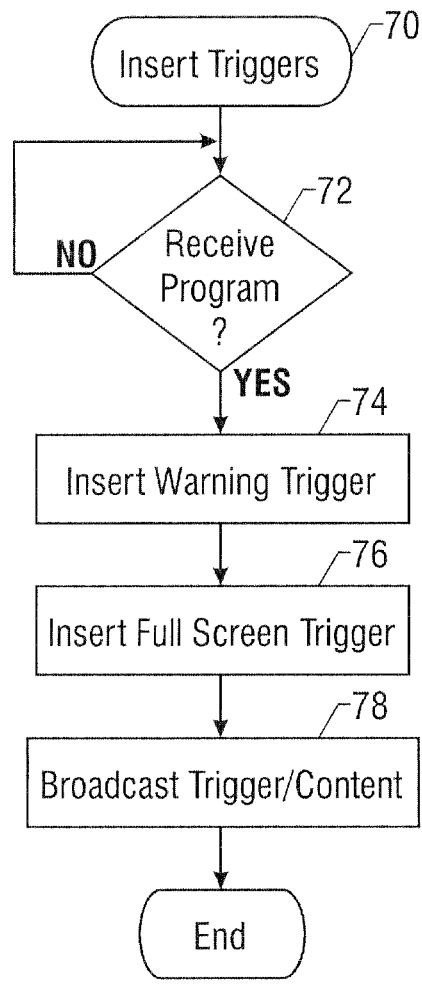
FIG. 5 is a flow chart for software that may be utilized on the head end of the system shown in FIG. 1 in accordance with one embodiment of the present invention.

Referring to FIG. 5, the insert trigger software 70, available on the head end 100, begins by determining whether a program has been received for transmission as indicated in diamond 72. If so, a warning trigger may be inserted as indicated in block 74. The warning trigger may be inserted into the stream of program information, at a point sufficiently before the end of the program, to warn the user that either the user should complete the use of enhancements or be prepared for the availability of those enhancements to end at the end of a program. It may also give the user sufficient time to designate that enhancements, associated with the ongoing program, should not be replaced with the new enhancements. Thus, the warning trigger provides an early warning to the user that the ability to freely access enhancements is about to be taken away, absent action by the viewer.

Next, a "full screen" trigger may be inserted as indicated in block 76. In one embodiment, the full screen trigger may include a tv: protocol URL, but, as mentioned above, a number of other triggers may accomplish similar functions. Thereafter, the triggers and content may be broadcast as indicated in block 78.

As a result, the television program may play with the associated enhancements. At a desired interval, for example five or ten minutes before the end of the program, an on-screen warning may be provided to indicate to the viewer that the program is about to end and the enhancements may also end. For example, the warning trigger may cause an overlay to appear on the user's screen 60 indicating that program is ending or enhancements are ending, as two examples. Thereafter, associated with the approximate end of the program, the program display may be transitioned from the format of FIG. 3 to the full screen television display shown in FIG. 4 in accordance with one embodiment of the invention. In this full screen television state, the user can no longer readily acquire the enhancements associated with the preceding and now ending program.

Figure 6:
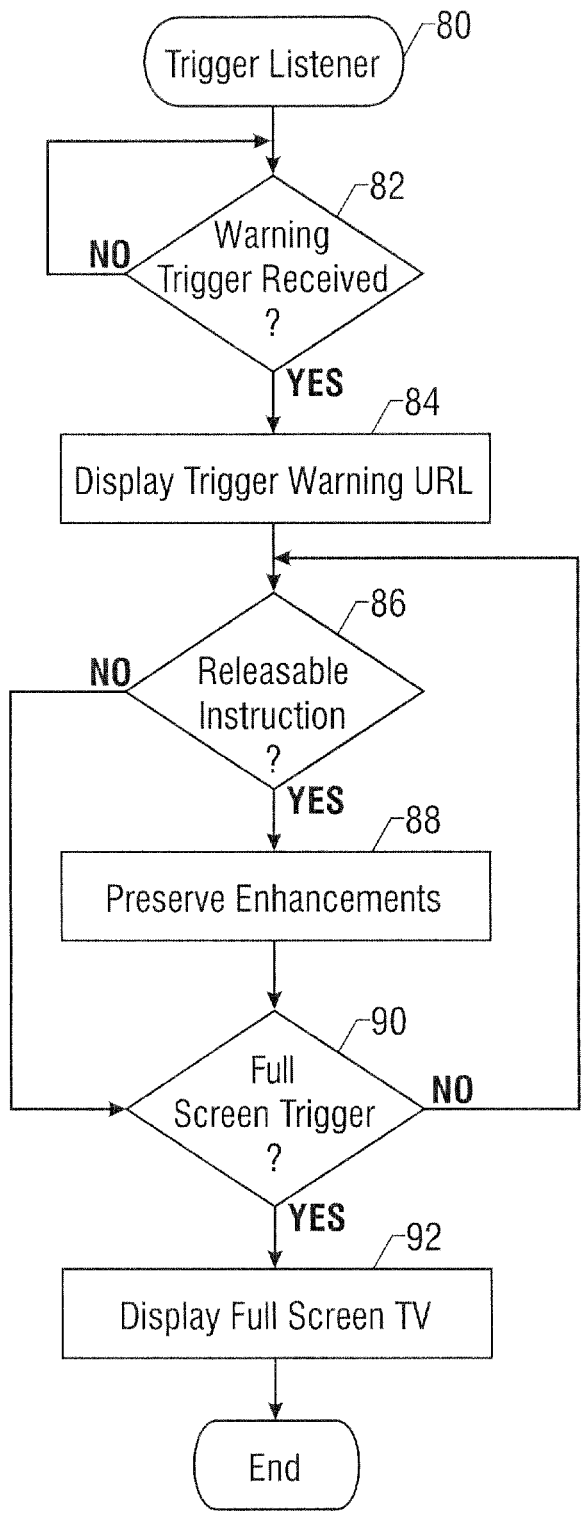
FIG. 6 is a flow chart for software which may be utilized on a receiver in the embodiment shown in FIG. 1 in accordance with one embodiment of the present invention.

The corresponding software 80 on a receiver 10, shown in FIG. 6, begins by determining whether a warning trigger has been received as indicated in diamond 82. If so, the warning URL may be utilized (block 84) to display an associated web page, warning the user that the enhancements are about to end absent user action.

A check at diamond 86 determines whether the .releasable property (triggerReceiverObj.releasable) is active. The .releasable property enables or disables the viewer from maintaining enhancements associated with one program during an ensuing program. Depending on the nature of the .releasable property, those enhancements may be inaccessible. In some cases, the check at diamond 86 may afford the viewer an opportunity to select enhancement retention or the ability to maintain access to enhancements from one program, during an ensuing program.

As an example, a viewer watching a program about animals, may read an associated enhancement in the form of a web page giving detailed information about a particular animal. The viewer may wish to continue reading that enhancement and may not wish to have that enhancement interrupted with an ensuing program, that the viewer may not even want to watch. Thus, that viewer may elect to preserve enhancements as indicated in block 88.

Next a check at diamond 90 determines whether the full screen trigger has been received. This trigger may include the tv: protocol URL in one embodiment. If so, the full screen display is activated as indicated in block 92. Again, the resulting transition may correspond to going from the screen format shown in FIG. 3 to the screen format shown in FIG. 4 wherein enhancement information is no longer accessible.

In some embodiments of the present invention, the viewer is both notified that enhancements are no longer available, and potentially disabled from continuing to access enhancements associated with one program during an ensuing program. The user may actually be given a warning sufficient to enable the user to specify that enhancements associated with one program can in fact continue to be accessed during an ensuing program. Thus, in some embodiments of the present invention, the desirability of avoiding automatic carryover of enhancements into the ensuing program is achieved while enabling the user to select a suitable override if desired.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving an enhanced television program;
   advising a user of the end of the enhanced program by transmitting a real-time event through an Internet Protocol multicast; and
   enabling, using a processor, the user to elect to retain enhancements so that the enhancements are retained after the end of the program.

2. The method of claim 1, wherein advising a user includes transmitting a trigger.

3. The method of claim 2 wherein transmitting a trigger includes transmitting a trigger with a Uniform Resource Locator.

4. The method of claim 3 wherein transmitting a Uniform Resource Locator includes transmitting a Uniform Resource Locator using a tv: protocol.

5. A system comprising:
   a processor-based device; and
   a storage coupled to said processor-based device to store instructions; the processor-based device having:
   a receiver to receive an enhanced television program, the receiver comprising:
   a video subsystem and a trigger listener to detect triggers relating to the end of a program in information from the video subsystem; and
   a trigger receiver object that receives messages from the trigger listener, accesses resources or enhancements according to the messages, and provides protocols to the tv: filter, the protocols being provided at least to:
   (1) warn a user of the end of a program,
   (2) make the enhancements inaccessible to a user by changing a display on a television from showing an enhancement frame to a full frame without the enhancement frame, or
   (3) both (1) and (2); and
   a tv: filter to enable the user to select enhancements after a program has ended,
   the processor-based device being provided to enable a user to elect to retain enhancements so that the enhancements are retained after the end of the program.

6. The system of claim 5 wherein said storage is to store instructions that enable the processor-based device to transmit a trigger that indicates the end of the program.

7. The system of claim 6 wherein said storage is to store instructions that enable the processor-based device to transmit a trigger including a Uniform Resource Locator using a tv: protocol.

8. The system of claim 5 providing the user with an override despite the protocols to continue to access enhancements after the end of the program.

9. The system of claim 5 wherein the system provides the user a warning of the end of a program in time for the user to specify the enhancement to be continued after the end of the program.

10. The system of claim 5 comprising a television to display an enhancement information frame to enable a user to select enhancements.

11. The system of claim 5 wherein the receiver comprises:
    a trigger listener to receive television content and the enhancement being transmitted with the television content over the internet; and
    a trigger receiver object communicating with the trigger listener and the tv: filter to receive messages from the trigger listener and provide protocols to the tv: filter depending on the messages.

12. The system of claim 11 comprising an announcement listener and a resource listener communicating with the logic listener to analyze a multicast with a television content and the enhancement received over the internet.

13. The system of claim 12 having a resource cache communicating with the resource listener to cache resources or the enhancements.

\* \* \* \* \*